Dec. 9, 1924.
J. M. DONOHUE
1,518,396
LAMINATED CELLULOSE ETHER CELLULOSE ESTER FILM
Filed Oct. 13, 1923
Nitrocellulose layers for prolonging flexibility under heat test.
Cellulose-ether layer.
INVENTOR,
John M. Donohue,
BY R. L. Stinchfield
ATTORNEY.

Patented Dec. 9, 1924.

1,518,396

UNITED STATES PATENT OFFICE.

JOHN M. DONOHUE, OF ROCHESTER, NEW YORK, ASSIGNOR TO EASTMAN KODAK COMPANY, OF ROCHESTER, NEW YORK, A CORPORATION OF NEW YORK.

LAMINATED CELLULOSE ETHER-CELLULOSE ESTER FILM.

Application filed October 13, 1923. Serial No. 668,411.

*To all whom it may concern:*

Be it known that I, JOHN M. DONOHUE, a citizen of the United States of America, residing at Rochester, in the county of Monroe and State of New York, have invented certain new and useful Improvements in Laminated Cellulose Ether-Cellulose Ester Films, of which the following is a full, clear, and exact specification.

This invention relates to cellulose ether films and particularly those which are laminated with layers of cellulose esters. One object of the invention is to provide a cellulose ether film of this character which maintains its flexibility, even after prolonged heating, under comparatively severe conditions. Another object of the invention is to maintain the flexibility by suitably laminating the film, but without unduly increasing its inflammability. Other objects will hereinafter appear.

In the accompanying drawing the single figure is a diagrammatic sectional view showing the elements of the film on an exaggerated scale.

In U. S. Patent No. 1,188,376, Lilienfeld, June 20, 1916, there are disclosed a series of ethers of cellulose. Certain of these are practically insoluble in water, and the present invention finds its primary application with respect to ethers having that property, although it is not restricted to them. When such ethers are made into films for different uses, such as photographic supports, it is desirable, under circumstances which are often met with in practice, that they withstand a prolonged heating without becoming too brittle. In testing such films to determine whether they will withstand the conditions of practice, severe tests are customarily made by heating them for several weeks at a temperature of 65° C. It is desirable that the films remain usefully flexible, even after twelve weeks of continuous heating at the above temperature.

I have discovered that films of cellulose ether can withstand such a severe test if they be coated on each face with a layer, preferably but not necessarily a very thin one, of a cellulose ester, such as nitrocellulose in the preferred form of my invention. The laminated structure is, of course, maintained by a firm adherence of the outer layers of cellulose ester to the inner layer of cellulose ether.

The cellulose ether layer, which is the main layer in my preferred product, may be made from any of the well known ether film-making compositions described in the prior patents in this art. The outer layers or coatings of cellulose ester may contain high boiling plastifiers and the like in connection with the cellulosic compound. I find, however, that a plain solution of nitrocellulose in a volatile solvent forms a very practical coating varnish, which leaves a firmly adherent layer that imparts the necessary properties to the product. For example, I dissolve 2% by weight of nitrocellulose in acetone and coat each face of the cellulose ether film with it. Upon drying, the outer layers are very adherent to the main or central layer of cellulose ether.

In the accompanying drawing 2 indicates the cellulose ether layer, while 1, 1 indicate the layers of cellulose ester, such as cellulose nitrate.

Films produced as above indicated are not as inflammable as those composed entirely of nitrocellulose,—in fact, preserve most of the advantageous properties of a film of cellulose ether, and in addition have the unexpected stability with respect to flexibility when heated for many weeks at 65° C. They make excellent supports for light-sensitive photographic emulsions. While cellulose acetate may be employed in place of cellulose nitrate in the above example, the latter is preferable and more certain in its results on the stability.

Having thus described my invention, what I claim as new and desire to secure by Letters Patent is:

1. As an article of manufacture, a cellulose ether film having on each face an adherent layer of cellulose ester, which layers maintain flexibility in said film after prolonged heating thereof at 65° C.

2. As an article of manufacture, a cellulose ether film having on each face an adherent layer of cellulose nitrate, which layers maintain flexibility in said film after prolonged heating thereof at 65° C.

Signed at Rochester, New York this 9th day of October, 1923.

JOHN M. DONOHUE.